No. 858,496. PATENTED JULY 2, 1907.
W. BAINES.
MOTOR CYCLE.
APPLICATION FILED MAY 22, 1906.

3 SHEETS—SHEET 1.

WITNESSES
W. P. Burke
D. J. Callaghan

INVENTOR
William Baines
By Richardson
ATTYS

No. 858,496. PATENTED JULY 2, 1907.
W. BAINES.
MOTOR CYCLE.
APPLICATION FILED MAY 22, 1906.

3 SHEETS—SHEET 3.

WITNESSES
W. P. Burke
D. J. Callaghan

INVENTOR
William Baines
By Richardson
ATTYS

UNITED STATES PATENT OFFICE.

WILLIAM BAINES, OF CROSBY, NEAR LIVERPOOL, ENGLAND.

MOTOR-CYCLE.

No. 858,496.　　　　Specification of Letters Patent.　　　　Patented July 2, 1907.

Application filed May 22, 1906. Serial No. 318,246.

*To all whom it may concern:*

Be it known that I, WILLIAM BAINES, a subject of the King of England, residing at 22 Victoria road, Crosby, near Liverpool, in the county of Lancaster, England, have invented new and useful Improvements in or Connected with Motor-Cycles, of which the following is a specification.

This invention has reference primarily to the propelling of cycles by auxiliary motor mechanism, so that a cycle, say an existing cycle, or the ordinary type of cycle, can have attached to it such a mechanism, and used as a motor-cycle, or alternatively, if and when desired, as an ordinary foot propelled cycle, by simply detaching the mechanism, which is so constructed and arranged, as hereafter described, as to be capable of being easily and quickly attached, and detached.

The drawings hereto annexed illustrate an auxiliary motor mechanism according to my invention as applied to an ordinary existing man-propelled bicycle.

Figure 1:
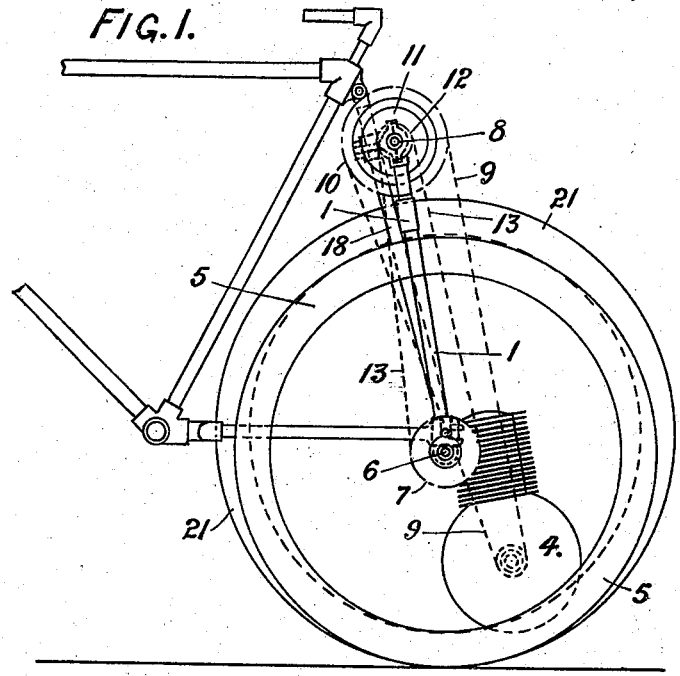
Figure 2:
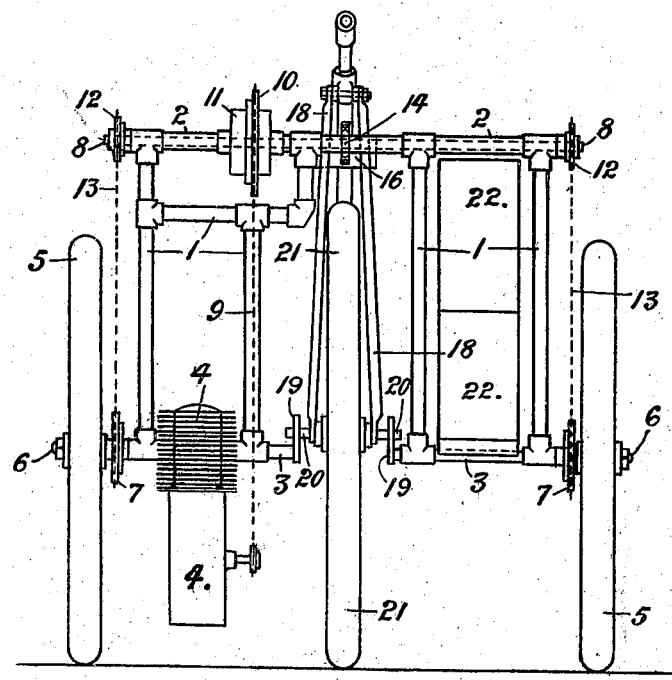
Figure 3:
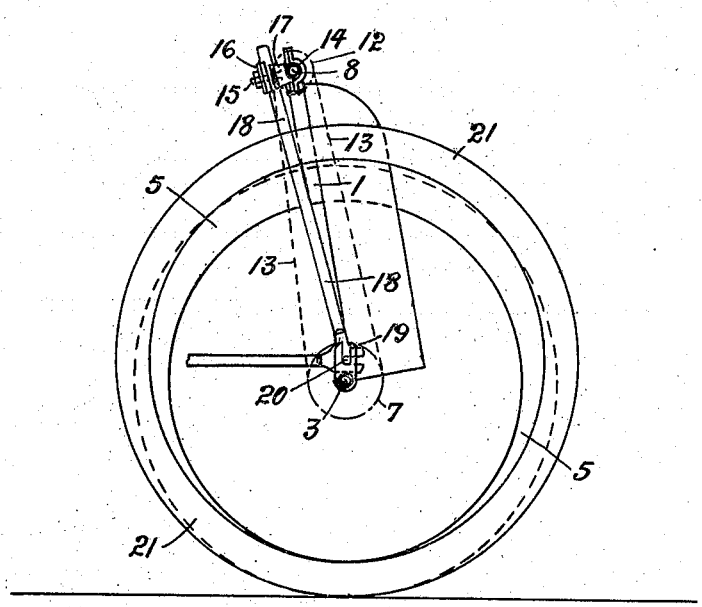
Figure 4:
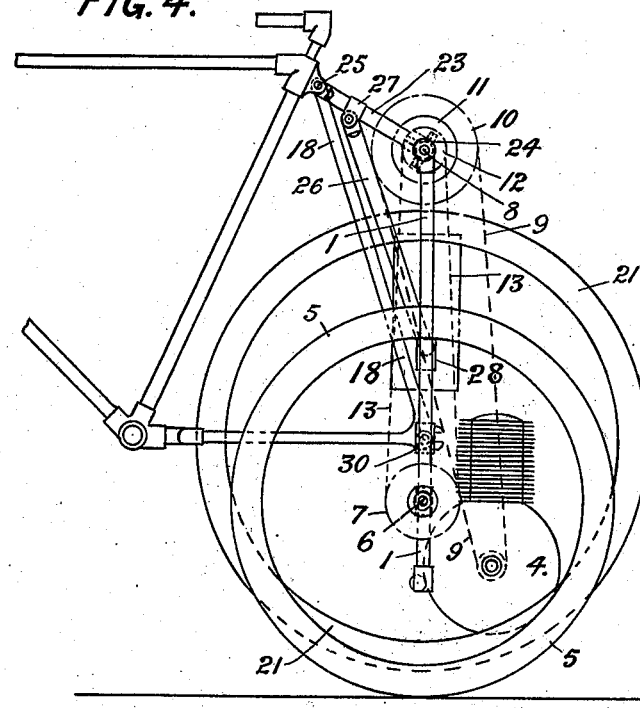
Figure 5:
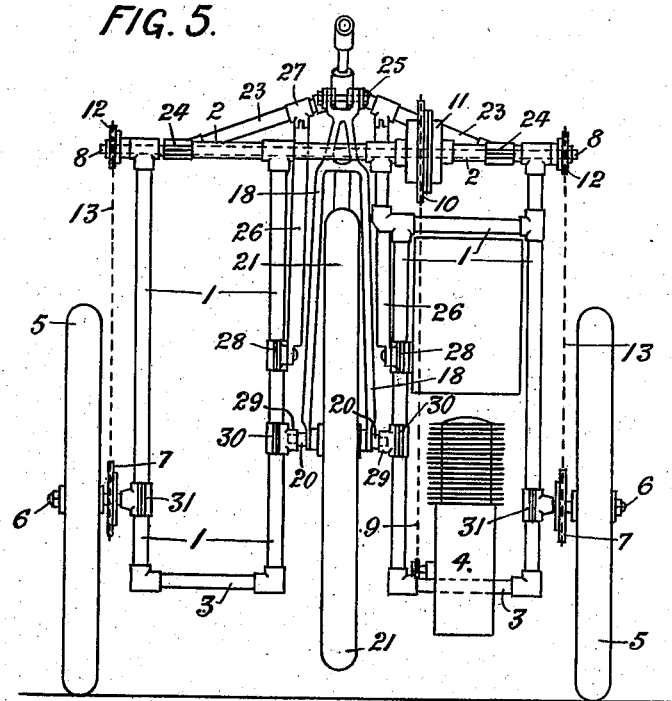

In these drawings, Figure 1 is a side elevation; and Fig. 2 is a back view showing the motor frame attached to a bicycle; while Fig. 3 is a cross section through the frame at the center. Fig. 4 is a side elevation of a slightly modified form of motor frame; and Fig. 5 is a back view of same.

Referring now to the drawings, and in the first instance to Figs. 1 to 3, the motor frame is of bridge form, namely, it comprises an upright part consisting of a plurality of vertical members 1 (two in the case shown) on each side, and an upper horizontal member 2, to which the members 1 are attached. The bottom connections of the members 1 at the one side consists of a tube 3, and at the other, of the upper part of the motor 4.

The road wheels 5 are mounted on axles 6, and are driven by sprocket wheels 7 connected with them, as hereinafter described.

In the upper tube 2 is a shaft 8, driven by the motor 4 through a sprocket chain 9, and sprocket wheel 10, connected with a differential gear 11 of any suitable kind on said shaft; and from this shaft 8 the road wheel sprocket wheels 7 are driven by sprocket wheels 12 on said shaft 8, and chains 13. Thus, motion from the motor is transmitted to the road wheels 5.

The attachment of the motor frame to the cycle frame is by a clamping device at the top, and through a connection with the axle of the cycle road wheel below. The top clamp consists of a boss 14 fitting over the tube 2, and having a bolt 15, which passes through a plate 16, the inner face of which is grooved to fit the cycle back fork. A filling block 17 is placed between the tubes 18 of the back fork and the tube 2. The two upwardly projecting jaws 19 on the lower inner ends of the motor frame tubes 3, grasp an extension 20 of the axle of the rear wheel 21 of the bicycle. These parts 19, 20, may be bound, by nuts or any suitable fastening device.

By adjusting and fixing the motor frame on the bicycle frame at the required height, it can be so arranged that any desired proportion of pressure—say one third—of the rear road wheel 21 of the cycle may come upon the road; or, this road wheel may be kept off the road entirely. But if it be arranged to bear on the road, by propelling the cycle by the ordinary pedals with the feet, the engine 4 can be started after the rider gets on the machine; while, if the road wheel 21 be off the road, the engine has to be started before the rider gets on.

On the motor frame in Figs. 1 to 3, the oil tank 22 is placed on the side of the bridge frame opposite to that on which the motor is placed.

Referring now to the modification shown in Figs. 4 and 5, the top attachment of the frame is by diagonal connecting bars 23, which are fastened by bolt clamps 24 to the tube 2, and to the bolt 25 at the other end which secures the back forks 18 of the bicycle at the top to the ordinary seat pillar socket. Additional connecting tubes 26 extend between the tubes 23 and the inner vertical tubes 1, such tubes being connected to hinges supported by clamp fastenings 27, 28, at their ends. By the fastenings 24, and 27, 28, being bolted to clamping fastenings, they can be adjusted to any position to suit different sizes of bicycles. The fastening between the frame tube *a* and the projecting part 20 of the axle of the wheel 21, consists of socket pieces 29 fitting over 20, and held by vertically adjustable clamps 30 on the tubes 1. The axles 6 of the road wheel 5 of the motor frame are fastened by vertically adjustable clamps 31.

The driving mechanism may consist of sprocket gear, or any suitable known kind of gearing. Also, in lieu of utilizing the differential gear 11, the sprocket wheels *j* may be mounted as "free-wheels" to revolve freely one way, but grip the other.

What is claimed is:—

1. In an auxiliary motor mechanism constructed and adapted to be readily attached to, and detached from a man-power driven cycle, for converting same at will to a motor cycle, a frame consisting of two side parts 1, and an upper transverse part 2 connecting the said two side frames together; a shaft 8 extending through the said tube 2, with gear wheels on each side, and by sprocket or other gear wheels connected with the two road wheels 5, one on each side of and connected to the lower part of said frame, and a motor 4 in one of the side portions of the frame, geared with the said shaft 8 by sprocket wheels and chains; substantially as set forth.

2. An auxiliary motor mechanism of the kind herein described, constructed and adapted to be readily attached to, and detached from, a man-power driven cycle, for converting same at will to a motor cycle, a frame consisting of two side parts 1 and an upper transverse part 2 connecting the said two side frames together; a shaft 8 extending through the said tube 2, with gear wheels on each side, and by sprocket or other gear wheels connected with the two road wheels 5, one on each side of and connected to the lower part of said frame, and a motor 4 in one of the side portions of the frame, geared with the said shaft 8 by sprocket wheels and chains, an attaching and detaching means at the upper part of said frame 1, 2, for connecting it to the upper rear portion of the cycle frame, and attaching devices on the lower part of the frame parts 1 adapted to engage with projecting parts 20 at the axle of the wheel 21 of the cycle; substantially as set forth.

3. In an auxiliary motor mechanism, constructed and adapted to be readily attached to, and detached from a man-power driven cycle, for converting same at will to a motor cycle, a frame 1, 2, carrying the motor, adapted to be detachably connected to the rear part of the cycle frame, said frame parts, at each side, having at their lower inner parts fastening means, with an aperture in same, and adapted to fit over an extension of the axle of the cycle wheel; substantially as set forth.

4. An auxiliary motor mechanism constructed and adapted to be readily attached to, and detached from a man-power driven cycle, for converting same at will to a motor cycle, a frame consisting of two side parts 1, and an upper transverse part 2 connecting the said two side frames together; a shaft 8 extending through the said tube 2, with gear wheels on each side, and by sprocket or other gear wheels connected with the two road wheels 5, one on each side of and connected to the lower part of said frame, and a motor 4 in one of the side portions of the frame, geared with the said shaft 8 by sprocket wheels and chains, and diagonal connecting members 23, 26 on said frame for connecting same with the upper rear part of the cycle; substantially as set forth.

In testimony whereof I have signed my name to this specification in the presence of two subscribing witnesses.

WILLIAM BAINES.

Witnesses:
S. GOODALL,
G. OKE.